United States Patent [19]

Fyfe

[11] Patent Number: 5,043,033
[45] Date of Patent: Aug. 27, 1991

[54] PROCESS OF IMPROVING THE STRENGTH OF EXISTING CONCRETE SUPPORT COLUMNS

[76] Inventor: Edward R. Fyfe, 1341 Ocean Ave., Del Mar, Calif. 92014

[21] Appl. No.: 646,288

[22] Filed: Jan. 28, 1991

[51] Int. Cl.$^5$ ............. B32B 35/00; B65H 81/00; E02D 5/60; E04C 3/20
[52] U.S. Cl. ............................. 156/71; 29/402.18; 52/223 R; 52/514; 52/725; 156/94; 156/161; 156/165; 156/172; 156/187; 156/191; 264/32; 264/35; 264/36; 264/135; 264/228; 264/229; 264/262; 264/266; 405/216
[58] Field of Search ............. 264/31–36, 264/40.1, 133–138, 154, 228, 229, 255, 256, 262, 263, 265, 266, 328.1, DIG. 57; 156/94, 98, 161, 165, 172, 185–187, 191, 71; 29/402.18; 52/223 R, 224, 169.1 B, 170, 514, 725; 405/216

[56] References Cited

U.S. PATENT DOCUMENTS

| | | | |
|---|---|---|---|
| 2,480,180 | 8/1949 | Bolton | 264/32 |
| 2,870,793 | 1/1959 | Bailey | 264/31 X |
| 3,156,598 | 11/1964 | Martin | 156/161 |
| 3,282,757 | 11/1966 | Brusee | 156/172 X |
| 3,390,951 | 7/1968 | Finger et al. | 405/216 X |
| 3,397,260 | 8/1968 | Lamberton | 405/216 X |
| 3,690,110 | 9/1972 | Wiswell, Jr. | 264/32 X |
| 3,813,098 | 5/1974 | Fischer et al. | 156/161 X |
| 4,068,483 | 1/1978 | Papworth | 264/32 X |
| 4,514,245 | 4/1985 | Chabrier | 156/161 |
| 4,771,530 | 9/1988 | Creedon | 264/262 X |
| 4,786,341 | 11/1988 | Kobatake et al. | 264/35 X |
| 4,892,601 | 1/1990 | Norwood | 156/185 X |
| 4,921,555 | 5/1990 | Skiff | 264/36 X |

*Primary Examiner*—Jan H. Silbaugh
*Assistant Examiner*—Karen Aftergut
*Attorney, Agent, or Firm*—John J. Murphey

[57] ABSTRACT

In a concrete column supporting an overhead load and having a base end resting on a surface, a process of strengthening the column to increase its ability to withstand atypical physical loading accompanying an earthquake, involving the steps of defining a work area about the surface of the column to which the strengthening is to be applied, the work area defined by circumferential marginal edges arranged in spaced-apart relation; overwrapping the work area with at least one layer of high-strength, stretchable fibers wherein the fibers are oriented at an angle to the vertical axis of the column; applying a coat of hardenable material, having a modulus at least as great as that of the fibers, over the layer of fibers to form a hard outer shell thereover; and, injecting a quantity of a hardenable, low-shrink liquid under the layer of fibers and over the surface of the work area in an amount sufficient to cause the fibers to undergo stretching from about ½% to about 4% of their elongation.

42 Claims, 3 Drawing Sheets

PROCESS OF IMPROVING THE STRENGTH OF EXISTING CONCRETE SUPPORT COLUMNS

BACKGROUND OF THE INVENTION

Field of the Invention

This invention relates to the field of civil structures and more particularly to concrete columns used to support overhead loads. It is a process of improving the ductility and resistance to shear of existing concrete support columns when they are subject to atypical loading such as is encountered in earthquakes.

Description of the Prior Art

The growth of world population has forced society to take on a multi-level configuration in certain locales, such as in cities and along heavily-travelled highways. Office buildings, high-rise apartment buildings and freeways are often built using concrete columns to support overhead levels, spans or structures. These columns vary in width and height and may be reinforced with internal steel rods Once in place, the physical characteristics of concrete columns become frozen and they are difficult, if not impossible, to remove, repair or alter without placing the overhead load in jeopardy.

Earthquakes historically have caused damage to civil structures. Mild quakes often cause cracks in the surface of columns while stronger quakes can actually cause them to collapse. The loads imposed on concrete columns in an earthquake may include a combination of lateral shifting and displacement, vertical movement in both directions, and torsional stress or twisting. Where the column does not collapse from this loading, it is often left in a damaged condition that will require repair or replacement before the structure which it is supporting is available for reoccupation. It is to these mild-to-moderately damaged columns, as well as undamaged columns, that this invention is directed.

Columns most often are set in or on a solid surface where the base of the column cannot move laterally. The load from above, however, may be fixed or pinned to the top of the column; in the latter configuration, the load and the column may move independently of each other. In the first case, called the "double bending" mode, sideways shifting of the column base, such as may occur in an earthquake, will place a bending moment on the column that is greatest in one direction at its base and greatest in the opposite direction at its top with the gradient acting linearly therebetween so that at some point along the column usually the midpoint, the moment is zero. Where the load is pivotally mounted on the column, only a single moment is generated when the base or top is subjected to lateral force and this is at its base. This is called the "single bending" mode. When the column is subjected to uplifting or central acting force, such as in an earthquake involving ground upheaval, a shear force is applied to the column substantially along its entire length.

The recent earthquake near San Francisco in 1989 revealed many existing concrete columns that support bridges, elevated highways or other overhead loads, are insufficiently ductile and lack sufficient strength to withstand these moderate to severe transient tremors. Replacing the concrete column with a stronger one poses a long-term solution to the problem that may not be complete before the next earthquake occurs and also poses a severe financial burden to the community. Repairing the columns in place has been accomplished mainly by surrounding a portion of the damaged column with a steel or strong metal jacket. This procedure has resulted in definite strengthening of the column, however, the costs involved are significant. Other attempts by the prior art to strengthen columns is by processes similar to that shown in U.S. Pat. No. 4,892,601, which is to fit a compressible elastomeric interlayer about the columns so as to mechanically bind the interlayer to the column, fitting a sleeve around the column clad with the elastomeric interlayer and filling the clearance between the interlayer and the sleeve with a flowable, hardenable composition essentially free from shrinking on hardening and allowing the composition to harden so as to form a solid core mechanically bonded to each of the interlayer and the sleeve. This process, however, does not solve the problem associated with the transient loads that are applied to columns during an earthquake.

Accordingly, there remains a significant problem in the industry to strengthen an existing column, under load, to significantly increase its ability to survive a moderate to severe earthquake and to sustain its support function during the fluctuating loads that occur therein.

Summary of the Invention

This invention is a process of increasing the strength and ductility of a column while it is under load and in place to better withstand the increased physical loading accompanying an earthquake. The overall process involves winding a filament or fiber fabric about the column over the whole or a portion thereof and subjecting the fibers to elongation by expanding the fiber wrap through interposition of a filling material under pressure between the surface of the column and the fibers. The filler material may be selected from a number of hardenable, liquid or semi-liquid materials such as epoxys, polyesters, foamable plastics, grouts and cements. Virtually any low or non-shrinkable material that may be pumped in a liquid form, under pressure, and that later will harden without significant shrinking is usable herein. The amount of fiber wrapping depends upon the type and degree of strengthening required for the specific column. To improve ductility, in order to withstand lateral loads, a column subjected to single bending moments would benefit from wrapping over the area of maximum moment, i.e., at its base. For columns subjected to double bending moments, the benefit would come from wrapping both ends. To improve shear strength, the column would be wrapped along its entire length. The amount of pressurization induced under the fiber is that sufficient to cause the fibers to stretch from about ½% to about 4% elongation.

The stretching of the fibers produces a significantly high stress in the interior of the column under the fiber wrap and substantially increases the ductility of the column so that it may elastically deform laterally and rotationally under loads that often occur in significant or severe earthquakes and further increase the strength of the column to withstand these atypical loads while under constant load from the overhead structure.

A column subjected to this inventive process need not be removed from service or relieved from its overhead load but may be subjected to this strengthening process in situ or while in place. The injection of the liquid hardenable material under the fiber wrap also causes the material to fill cracks and crevices and spalling that have occurred to the column from prior transient loading or from age and will repair the matrix thus making the column better able to meet its initial design criteria. The process disclosed herein is useful with a wide range of height and diameter concrete columns, notwithstanding whether they are internally reinforced, such as with steel bars, or are constructed in monolithic form. The columns strengthened by this process may be overlaid with additional layers of material to cosmetically hide evidence of such repair and shield the underlying material from the damaging effects of ultraviolet radiation.

Columns having cross-sectional shapes other than circular may be treated by this process and such are fully contemplated in this invention. In fact, with respect to columnar support handling dynamic loads, such as for overhead roadways and the like, the "columns" are often tall structures having a length of as much as 100 feet and a width or thickness of up to 8 feet and these are fully contemplated as coming within the definition of "column" as that term is used in this patent application. However, with these non-circular configurations, in some (not all) cases, additional steps may be necessary to first bring them into circular or elliptical cross-sectional shape before wrapping the fibers thereabout.

The process is not time-consuming and those performing the various steps need not require extensive training, so that the cost of manpower is maintained at a reasonable level. No pre-forming of metal sleeves or other such devices are required so that material costs and pre-forming costs are held to a minimum. The materials used in the operation, while presently having a unit price in excess of ordinary outdoor construction materials, are not excessively expensive because the amounts used on each column are very modest. Additional savings will be achieved by purchasing the materials in bulk for applying them to a large number of existing columns.

Accordingly, the main object of this invention is a process for increasing the ductility and strength of a concrete support column in situ without removing the column from service or without the need to provide auxiliary support during the repair process. Other objects include an inventive process useful in strengthening columns that have a wide range of sizes and shapes and that is useful, notwithstanding whether the columns are internally reinforced or made in monolithic form. Still other objects include a process that may be used to repair cracks and spalling in existing columns, a process that may be hidden from view after completion by the application of cosmetic materials thereover so as to totally hide such strengthening work from public view, a process that is applicable to columns having a number of different cross-sectional geometries and designs, a process that is within the grasp of presently trained construction workers, a process that does not utilize a large amount of costly materials or require preformation of metal sheets, casts or other such devices, and a process of strengthening a column, the results of which present an attractive surface that can be further decorated to enhance its style.

These and other objects of the invention will become more clear when one reads the following description of the preferred embodiments taken together with the drawings appended hereto. The scope of protection sought by the inventor may be gleaned from a fair reading of the claims that conclude this specification.

DESCRIPTION OF THE PREFERRED EMBODIMENT

Figure 1:
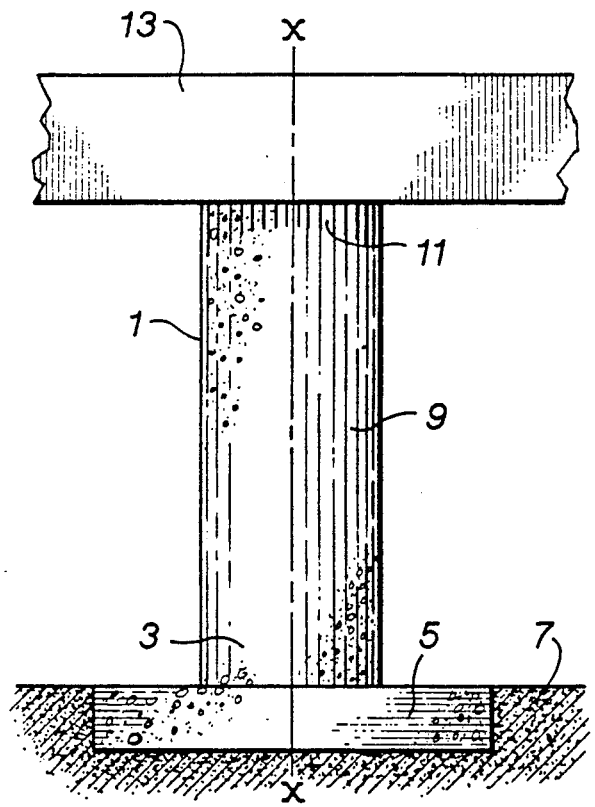
FIG. 1 is a side elevational view of a typical column to which this inventive process may be applied.

Turning now to the drawings wherein like elements are identified with like numerals throughout the twelve figures, FIG. 1 shows a typical column 1, defined by a bottom or base 3, that normally rests on a pad 5 of concrete or other strong material, that in turn rests upon or is submerged in a supporting surface such as the earth 7. Column 1 has an elongated central portion 9 rising above base 3, terminating at an upper support end 11 usually in the form of a flat surface that is connected or otherwise attached to an overhead structure 13 to provide support thereto. Column 1 may be circular in cross-section as shown in FIGS. 2 through 5 or be formed in a variety of geometrical figures such as hexagonal or rectangular and yet be amenable to and benefit from this inventive process. Column 1 is shown to be monolithic in character, i.e., not containing steel or other support rods, and to be uniformly centered about a central axis x—x.

During severe loading, such as during an earthquake, column 1 is subjected to torsional loads that twist the column base and central portion with respect to upper support end 11 and is further subjected to lateral displacement between base 3 and support end 11, as well as additionally loaded along main axis x—x. To utilize this inventive process, the engineer must determine the strengthening characteristics needed for the particular application. First, he/she must determine what type of strengthening is desired, i.e., whether to improve ductility to withstand transverse loading, to improve shear strength to resist compressive loading, or to make a combination of them. Secondly, he/she must determine where the strengthening is to be applied, i.e., at one or both ends of the column, in separate bands spaced along the column, along the entire length of the column, or at a flair or other discontinuity. Thirdly, he/she must determine the amount of strengthening needed in the particular application. With these characteristics determined, the engineer then lays out a work area 15 on the column surface 17 with chalk or other marking media.

As previously discussed, for columns arranged in a single bending mode, the improvement in ductility would require the process to be applied in the area of greatest bending moment which is most likely to be at the base of the column. For columns that are arranged in the double bending mode, this process would provide increased ductility and strength to withstand lateral shifting and the bending moments created thereby by applying the process to both ends of the column where the moment is maximized but in opposite directions. For increasing the strength to withstand increased shear loading, the entire length of the column would be made subject to this inventive process.

In the detailed description that follows column 1 is considered to be in a single bending mode with base 3 fixed to pad 5 and the overhead structure 13 pinned or pivotally attached to column support end 11, so that the bending moment for shifting or transverse loading of overhead structure 13 is maximized at base 3. This is not to be considered as limiting this inventive process in any way whatsoever. Should column 1 be considered to be in a double bending mode, then the process hereinafter described would be applied to both the upper portion and the lower portion of column 1.

In this process, the previously defined work area 15 is marked off about column surface 17 by a circumferential upper marginal edge 19 and a circumferential lower marginal edge 21. It is later over-wrapped with at least one layer of high-strength, stretchable fibers and over coated with a hard resin. Thereafter, a hardenable liquid is injected under the layer of fibers to stretch them between about ½% to about 4% elongation. The particular distance between upper marginal edge 19 and lower marginal edge 21 may range from the entire height of column 1, in the case of determining the need to increase the shear strength of the column, to a shorter area generally adjacent either the top or the bottom of column 1. Further, depending upon the damage previously incurred by the column from previous earthquakes or other phenomena, it may be desirable to utilize this process in more than one work area along the length of the column such as in separate bands. These bands are considered to be particularly effective when made in a minimum height of at least 50% of the column diameter. It is preferred, however, that work area 15 at any particular point on a column undergoing this inventive process be defined by marginal edges that are spaced apart no less than one column diameter.

Figure 2:
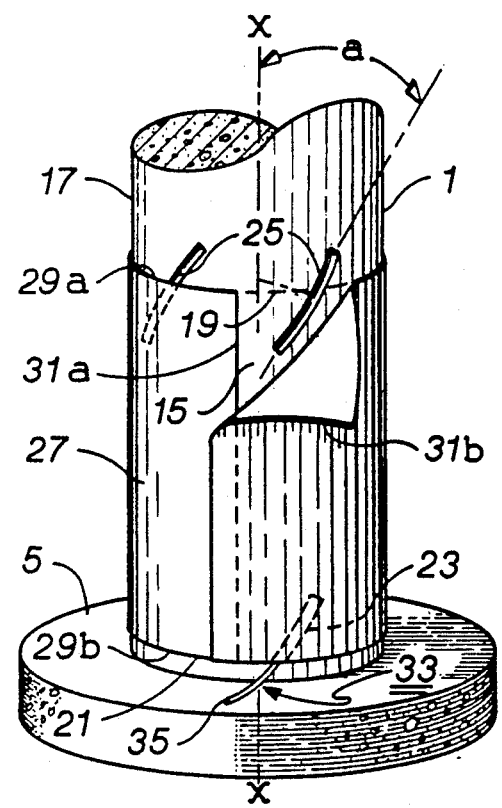
FIG. 2 is an illustrative view of the lower portion of the column shown in FIG. 1 showing the early steps of the process of forming channels in the outer surface of the column and overwrapping the column with a liquid-impermeable bladder or membrane.
Figure 3:
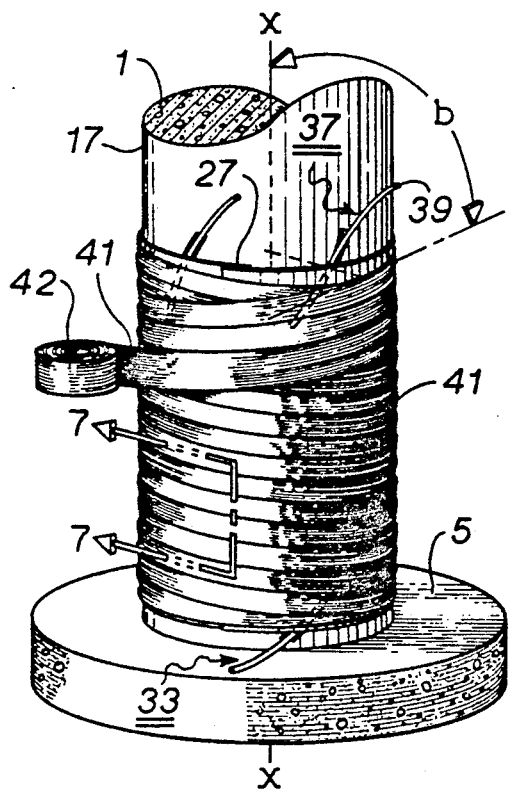
FIG. 3 is a similar view to FIG. 2, showing a later step in the process where the bladder is over-wrapped with fibers.

At least one injection channel 23 is formed in the surface of column 1 extending from within work area 15 to below lower marginal edge 21. While one such channel 23 is operable in this inventive process, for columns that have diameters of one meter or more, it has been found more convenient to arrange a plurality of such channels, such as on the order of three or four, equally spaced about lower marginal edge 21. Injection channel 23 may be formed in column surface 17 by such known means as chiseling the concrete with hand tools or by grinding or saw-cutting or some other abrading process and all are fully contemplated within the spirit and scope of this invention At least one vent channel 25 is formed in column surface 17 extending from within work area 15 above upper marginal edge 19. As in the case of injection channels 23, for large-diameter columns, it is preferred to form a plurality of channels spaced uniformly about upper marginal edge 19. It is also preferred that both channels 23 and 25 are formed at an angle "a" to column centerline x—x, as shown in FIGS. 2 and 3, such as 45°, to provide more compatibility between them and later steps in the process. Further, channels 23 and 25 may extend only slightly into work area 15 or substantially all the way to the opposite marginal edge, depending upon such factors as the width of marginal edges 19 and 21, the viscosity of the liquid to be injected, and the size of the column. It is important not to allow a joinder of injection channels 23 with vent channels 25 as such will cause short circuiting of the later-injected hardenable liquid and allow gas pockets or trapped air to remain in the work area that will reduce the benefits of the process These steps may be interchanged.

After injection channels 23 and vent channels 25 have been formed, a flexible, liquid-impermeable membrane or bladder 27 is applied against column surface 17 over work area 15. As shown in FIG. 2, membrane 27 is wrapped circumferentially around column 1 such that its upper and lower marginal edges 29a and 29b extend to and preferably slightly beyond work area upper marginal edge 19 and lower marginal edge 21 respectively. Membrane 27 may be made from a wide variety of flexible, liquid-impermeable materials including plastics, rubbers and admixtures and compounds thereof. HYPALON (trademark), a heat-sealable, flexible sheet material from DuPont Chemical Co., has been found to be a desirable material for use as membrane 27. As shown in FIG. 2, the vertical terminal edges 31a and 31b of membrane 27 are overlapped slightly, preferably at least about 4 inches, and thereafter heat-sealed together. To handle the rough surface of column 1, including the potential presence of blisters and spalls, and to sustain the rigors of installation by construction work personnel, it is preferred that membrane 27 have a minimum thickness of about 0.0010 of an inch or 10 mils.

Injection means 33 is partially inserted in injection channel 23, under membrane 27 and includes one terminal end 35 that is allowed to remain outside membrane 27. Likewise vent means 37 is partially inserted in vent channels 25, under membrane 27, and includes one terminal end 39 that is allowed to remain outside membrane 27. Means 33 and 37 may take the form of tubing or piping or other pressure-resistant, fluid-carrying conduit. Flexible, high-pressure extruded plastic tubing has been found usable herein. Terminal ends 35 and 39 may contain connection means, such as a series of threads or clamping means, for later connecting to other high-pressure, fluid-transmitting media. Where more than one injection channel 23 or vent channel 25 is formed in work area 15, injection means 33 and vent means 37 are needed in each said channel. Preferably, injection means 33 and vent means 37 are cemented or otherwise locked into place with hydraulic-type cement or other medium such as "SIKADUR 31" (trademark) Hi-Mod Gel, a two-component epoxy available from Sika Corporation, P.O. Box 297, Lyndhurst, N.J. 07071, so as to insure rigid fixation of these devices in their respective channels and prevent leakage of liquid therefrom as will be more fully explained later in this specification.

The cutting or forming of injection channels 23 and vent channels 25 may be dispensed with and injection means 33 and 37 merely laid on top of column surface 17 and membrane 27 wrapped over top of them. While this embodiment is fully contemplated within the spirit and scope of this invention, it poses problems in causing discontinuities in membrane 27 and subsequent layers and is often a source of leakage, especially with the use of pressure-retaining means, subsequently introduced.

Figure 4:
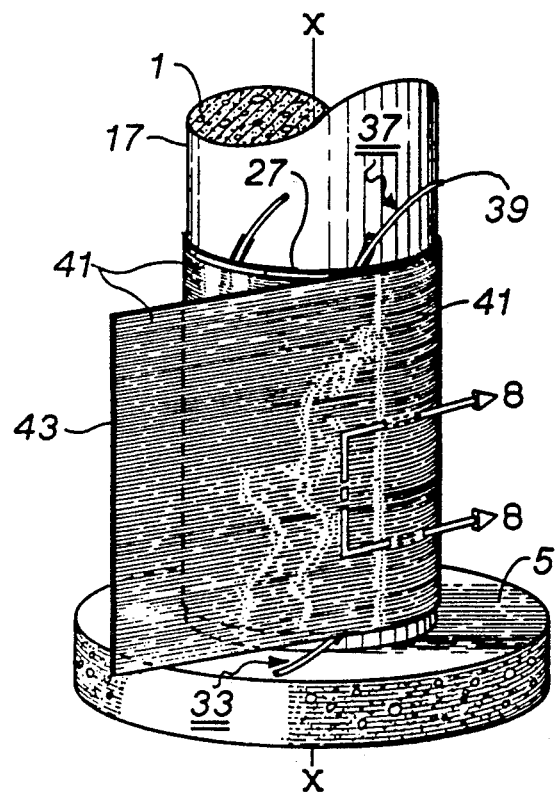
FIG. 4 is another embodiment of the process showing the portion of the column, as in FIG. 2, being over-wrapped with multiple layers of a single sheet of wide fiber tape.

As shown in FIGS. 3 and 4, work area 15 and membrane 27 are over-wrapped with at least one layer 41 of high-strength, stretchable fiber or fibers. The stretchable fibers usable in layer 41 may be selected from a wide range of high-strength material, such as carbon fibers, graphite fibers, polyester fibers, glass fibers, polyaramid fibers and combinations thereof. They should have an ultimate elongation in the range of 4% to 8%, and preferably 5% to 7%. This translates to an ultimate tensile strength in the fiber in the area of 500,000 psi although it may vary for different species of fiber. Generally, the fiber diameter should be on the order of 0.00048 inches and may range upwards to 0.017 inches and beyond. Fibers 41 may be formed into a thin (i.e. 10 mils), unidirectional tape where they are arranged side-by-side and either laminated between opposed layers of carrying materials, such as woven cotton, high strength polyaramid, or other such material, or held together with cross-fibers. The width of the tape may vary from as little as one or two inches to 48 inches or more. The tape may be applied with or without a coating of adhesive. It is preferably pulled tightly while being applied. It has been found that about four layers of certain fibers will provide significant strengthening to a wide variety of column sizes and shapes.

Fibers 41 may be made in a roll of narrow tape 42. When using narrow fiber tape 42, it is preferred to wrap it around the column surface at an angle "b" as shown in FIG. 3 and overlap a portion of the previous wrap. It is preferred that the angle be held constant throughout the entire wrapping, except to be reversed during any subsequent layer applied thereover. The angle may be changed, however, depending upon the needs of the process and the needs of the particular portion of the column to be wrapped. For instance, a narrow tape is preferred when overwrapping a work surface that includes a "flair" or an "outrigger bend", because the tape can be adjusted to the varying shapes. This is similar to wrapping one's joint with an athletic bandage, i.e, the tape should be applied in a uniform manner over the entire portion of the work area determined to be strengthened.

As shown in FIG. 4, a wide fiber tape 43, on the order of 48 inches in width, may be used over a work area of constant diameter. In this configuration, the fibers are arranged at a right angle (i.e., "b" is 90°) to column axis x-x or a zero angle to the horizontal. Such a wide fiber tape, as shown in FIG. 4, facilitates the wrapping steps and reduces labor costs associated with this aspect of the process. The fibers may also be carried on a liquid-impermeable substrate that will form membrane 27 as well as layer 41 when applied in one combined step.

After the fiber layer or layers are in place, the exposed surface of fiber layer 41 is coated with a layer 47 of hardenable liquid material such as epoxy resin or polyester resin or other high-strength, curable material. Layer 47 may be applied by brush or spray or other processes known in the art. The tensile elongation of coating layer 47 that overlies fibers 41 should be greater than that of the individual fibers so that, as the fibers are stretched, coating 47 expands and stretches likewise without cracking or breaking.

Figure 5:
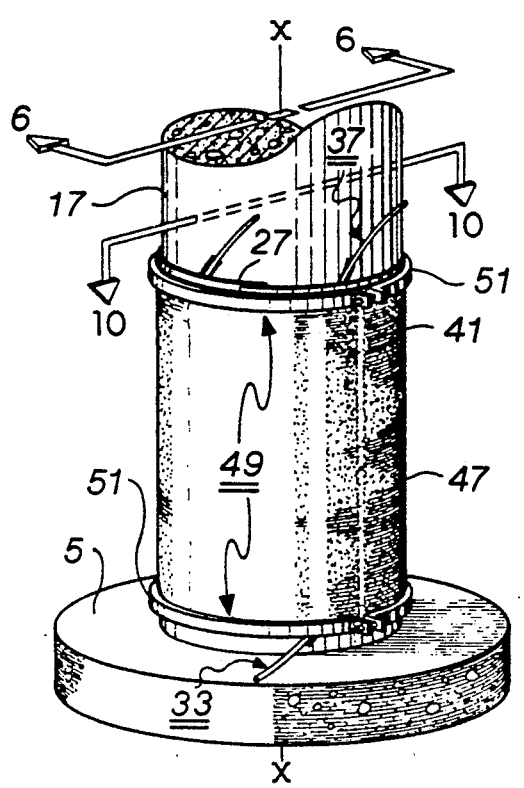
FIG. 5 is a view similar to FIG. 4, showing the step of applying pressure-retaining means about the fiber wrap.
Figure 10:
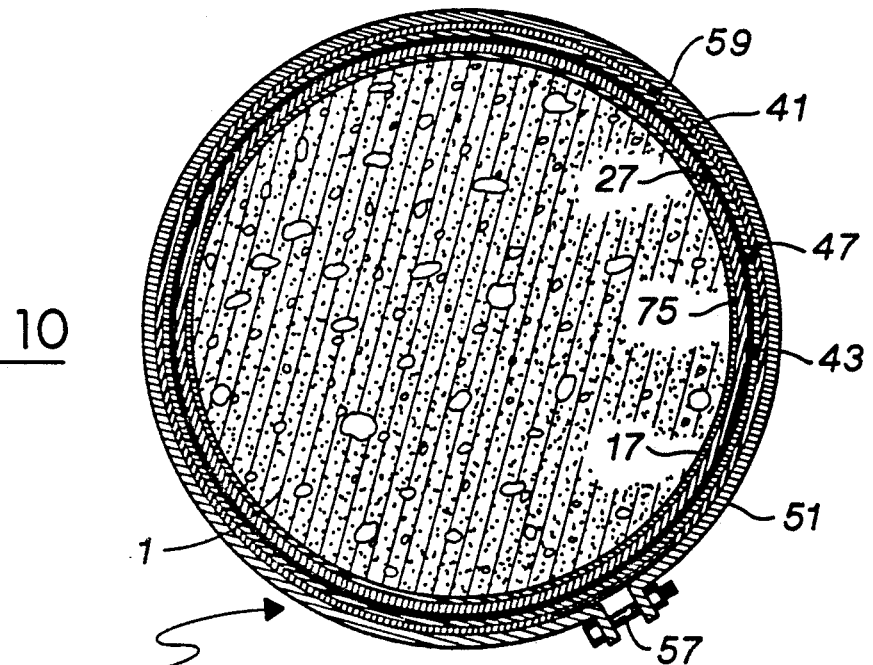
FIG. 10 is a horizontal sectional view, taken along lines 10—10 in FIG. 5, showing one embodiment of the pressure-retaining means used in this process.
Figure 11:
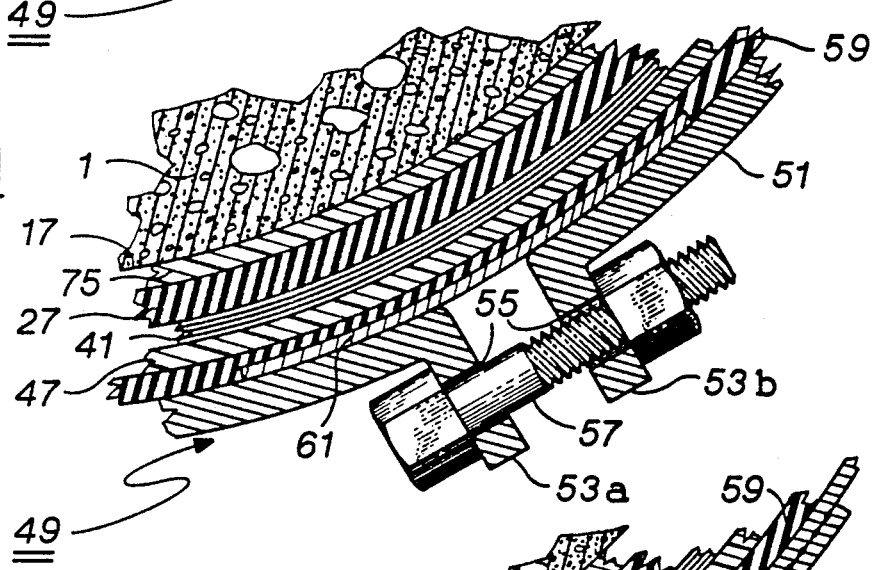
FIG. 11 is a close-up sectional view of one portion of the pressure-retaining means shown in FIGS. 5 and 6, showing the unique slider plate utilized in completing the seal over the elastomeric means; and, FIG. 12 is a close-up sectional and fragmentary view of another embodiment of the pressure-retaining means used in this process.

After hardening, a pressure-retaining means 49 is applied over layer 47, circumferentially about column 1 over work area upper and lower marginal edges 19 and 21 respectively, to clamp layer 47, fiber layer 41 and membrane 27 tightly against column 1 such as shown in FIG. 5. One embodiment of means 49 is shown in FIGS. 10 and 11 to comprise a metal band 51 formed circumferentially about column 1 having a pair of terminal ends 53a and 53b turned outward from column surface 17 and having a pair of apertures 55 formed therethrough for receipt of a cross-bolt 57 or other type of fastening device. An elastomeric seal 59 is included in means 49 and is interposed metal band 51 and outer layer 47. NEOPRENE (trademark) (70 Durometer) tape, on the order of ⅛ inch thick and ¾ inch wide, has been found useful as seal 59. It has been found more efficacious to also insert a small, hand-size, slightly curved slider plate 61 under terminal ends 53a and 53b, as shown in FIG. 11, to facilitate tightening cross-bolt 57. A unique feature of this type of closure is that, upon tightening cross-bolt 57, slider plate 61 allows band ends 53a and 53b to close smoothly over seal 59 and plate 61 to be buried in the seal to form a pressure-resistant closure.

Figure 12:
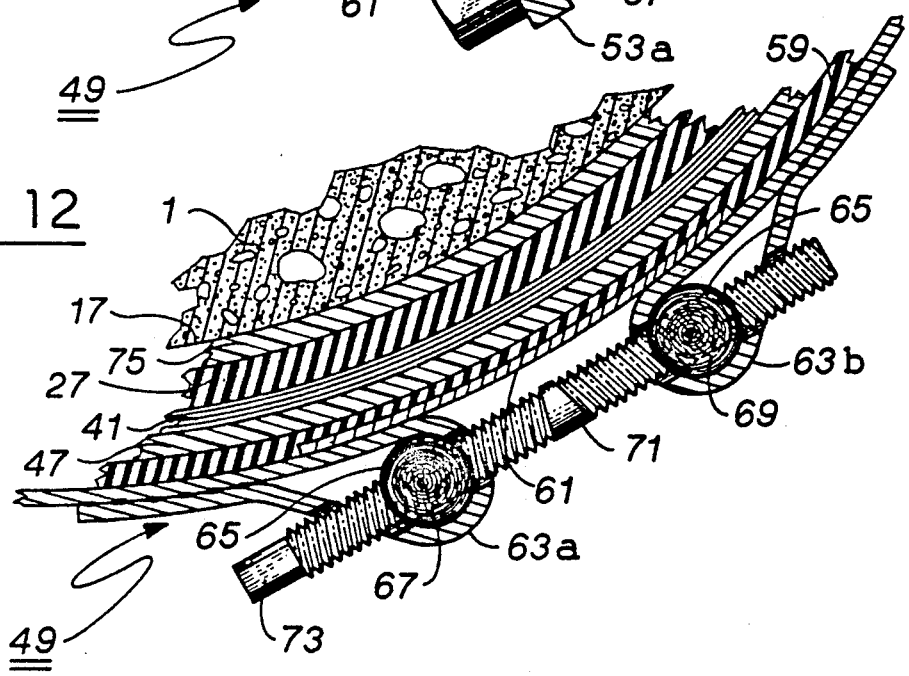

Referring to FIG. 12, another useful embodiment of band ends 53a and 53b has been found in which the ends are doubled back onto each other and welded to form loops 63a and 63b. A short length of solid bar 65 is placed transverse in each loop and a left-handed threaded bore 67 is formed completely through loop 63a and its enclosed bar 65 and a right-handed threaded bore 69 is formed through loop 63b and its enclosed bar 65. A rod 71, having one-half its length formed with left-handed threads and the other half formed with right-handed threads, is threadably received in bores 67 and 69 so that, by twisting rod 71 by its cap 73 in one direction, loops 63a and 63b are drawn together and by twisting in the opposite direction said loops are forced apart.

Figure 6:
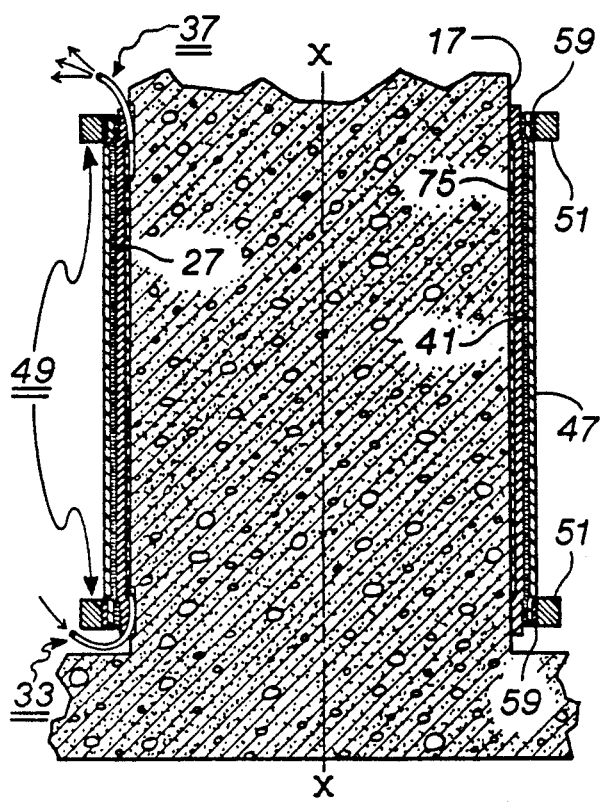
FIG. 6 is a side elevational sectional view of part of the column showing in more detail the configuration of the bladder, nozzles, fiber wrap, pressure-retaining means, and the step of injecting liquid at the column base and exhausting air from above, taken along lines 6—6 in FIG. 5.
Figure 7:
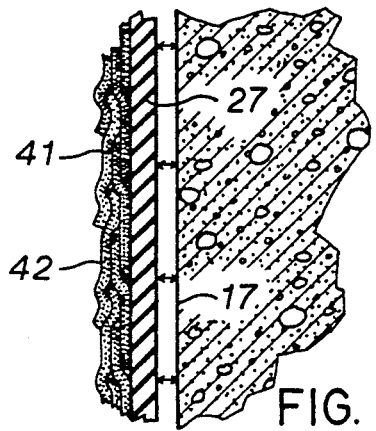
FIG. 7 is a close-up sectional view of a broken-out portion of the column showing the arrangement of the bladder and overlying tape wrap, taken along lines 7—7 in FIG. 3.
Figure 8:
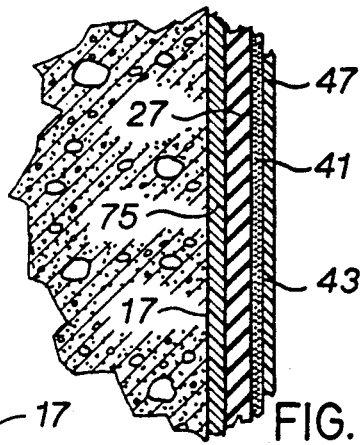
FIG. 8 is a close-up sectional view of the embodiment wherein one sheet of wide fiber tape is wrapped in layers over the bladder, overcoated with a layer of hardenable material, and a hardenable liquid injected between the column surface and the bladder, taken along lines 8—8 of FIG. 4.
Figure 9:
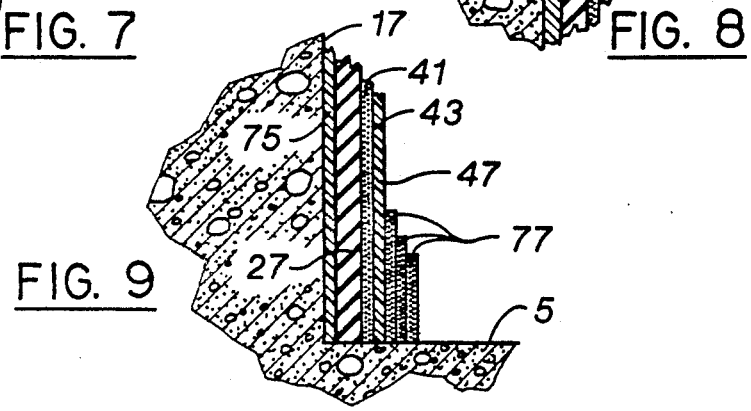
FIG. 9 is a view similar to that of FIG. 8 showing the imposition of added layers of passive fiber wrapping over the elongated fiber strands as is explained later in this specification.

After pressure-restraining means 49 is in place, injection means 33 is connected to a high-pressure hydraulic pump (not shown) through known means such as a manifold (not shown) attached to injection means terminal ends 35. A hardenable, low or non-shrinkable liquid material 75 is thereafter pumped through injection means 33, to fill the area, between column surface 17 and membrane 27. As it is injected, material 75 rises up to force any air to be exhausted through vent means 37 as shown in FIG. 6. Once the air has been vented from the area between column surface 17 and membrane 27, vent means 37 is shut off, such as by pinching the tubing or otherwise closing off, in known manner, and the pumping of liquid material 75 is continued in an amount sufficient to increase the internal pressure therein, increase the column diameter under layer 41, and cause the fibers to undergo stretching. This pressurization increases the total amount of material injected in the space between column surface 17 and membrane 27, and causes both layer 41 of stretchable fibers and hardened coating layer 47 to move slightly away from column surface 17. To maximize the strengthening of column 1, the pumping is continued until the fibers undergo a percentage stretch of their elongation in the range of between about ½% and about 4%.

This elongation in turn provides significant compressive force to the concrete underlying work area 15. It has been found, for instance, that in a 24-inch diameter column, continuing the injection of liquid such as to produce 1% elongation of the fibers, results in 250 pounds of pressure being placed on every square inch of concrete underlying work area 15. Even further, with 2% elongation of the fibers, it has been found there is a compressive force of 400 pounds per square inch developed on the concrete underlying work area 15.

The final result of the process is a relatively smooth composition that is slightly greater in overall diameter than column 1. The amount of elongation of fibers 41 depends upon the material making up the fibers, the fiber diameter, and the pressure developed in the pump. Pump pressures of 50 to 500 pounds per square inch are usually needed to cause the fibers to stretch sufficiently to provide the column strengthening desired by this invention.

The hardenable, low or non-shrinkable liquid material 75 can be chosen from a wide variety of materials that have the following characteristics: It must be able to be formulated in a liquid state and pumped under high pressure. It must also be hardenable into a stable solid and undergo little, if any, shrinkage when passing from the liquid to the solid state. It should have long term weathering properties. Materials that have these characteristics and are usable herein include hardenable polyester resins, hardenable epoxy resins, mixtures of these two materials and mixtures of these materials with other like materials, grouts, cements, and other such construction-type material. Also included are self-foaming compositions that will expand in volume once put in place. These materials may be diluted or filled with bulk (filler) materials to lower their unit cost. For the most part, these materials are either catalyzable by the addition of specific chemicals prior to being injected, or are self-curing once mixed with water or some other liquid.

In certain situations, after the fibers have been stretched, additional tight wraps or layers 77 of materials, including fiber-containing tapes, may be necessary to provide additional strengthening to the column, especially in areas of discontinuities in geometric configuration and where reinforcing steel rods are overlapped at certain joints. For instance, in a typical concrete column, a series of L-shaped reinforcement rods are cast in the pad, having rod extensions that project upward out of the top surface of the pad. The column is cast in place on the pad with other reinforcement rods that overlap these upward projections and are welded thereto. The use of additional passive layers 77 of tape is often required to strengthen the overlap joint between these rods and prevent them from breaking or shearing during an earthquake. KEVLAR (trademark) and other high tensile modulus fiber tape (e.g. glass) has been found usable as a passive wrap material.

Following the completion of the pressurization step, pressure-retaining means 49 is removed and injection means 33 and vent means 37 are removed from their positions in channels 23 and 25 respectively. This latter removal step is most conveniently made, in the case of high-pressure resistant plastic tubing as the injection means and vent means, by merely cutting the tubing flush with the marginal edges of fiber layer 41 and, at the same time, trimming and removing any portion of membrane 27 that happens to extend above the cured fibers and overlying coating layer 47.

As previously indicated, this process may be applied over the entire length of column 1 to increase the resistance to shear loads where such is determined to be desired through engineering analysis. In such a case, the entire thickness of the fiber wrap need not be as great as in the case of utilizing this process to increase the ductility of the column and to reduce the tendency for lap joint tensile bond failure of the reinforcing rods.

In the case of columns having cross-sectional configurations other than circular, such as rectangular, hexagonal, etc., it has been found that this process is extremely useful when there is over cast about the geometric shape a circular or, more preferably, oval shape of new concrete which is thereafter subjected to the process of this invention.

For various structural reasons and in the matter of wrapping discontinuities in columns such as outrigger bends and flairs, etc., this process may include one or more layers of stretchable fibers over which is laid one or more layers of passive wrap as previously described, and thereafter a second set of layers of stretchable fibers. Such combinations would provide unique forms of compressive strength to various features and discontinuities in the concrete and such are fully contemplated within the scope and spirit of this invention.

In another embodiment of this invention, in certain cases it may be desirable to coat membrane 27 with a layer of epoxy or other hardenable material prior to overwrapping the layer of stretchable fibers. Again, these combinations would result in different physical characteristics arising from the finished process so as to satisfy certain engineering requirements under certain configurations and loading conditions.

After pressure-retaining means 49 has been removed and injection means 33 and vent means 37 are removed, it may be desirable to over-coat work area 15 with a cosmetic coating to hide the underlying work and protect the underlying fibers and hardened coat 47 from the damaging affects of ultraviolet radiation from the sun. A wide range of cosmetic materials, including epoxy resins and plaster are available for this operation.

What is claimed is:

1. In a concrete column supporting an overhead load and having a base end resting on a surface, a process of strengthening the column to increase its ability to withstand atypical physical loading accompanying an earthquake, comprising the steps of:

a) defining a work area about the surface of the column to which said strengthening is to be applied, said work area defined by circumferential marginal edges arranged in spaced-apart relation about the column;

b) overwrapping said work area with at least one layer of high-strength, stretchable fibers wherein said fibers are oriented at an angle to the vertical axis of the column;

c) applying over said layer of fibers a coat of hardenable material, having a tensile elongation at least as great as the tensile elongation of said fibers and being capable of expanding and stretching with said fibers, and hardening said coat to form a hard outer shell over said work area; and, d) injecting a quantity of a hardenable, low-shrink liquid under said layer of fibers and over said surface of the concrete column within said work area in an amount sufficient to cause said fibers to undergo from about ½% to about 4% elongation.

2. The process of claim 1 wherein the step of defining said work area involves determining whether the column is in a single bend mode or a double bend mode and determining whether the strengthening is to be applied to improve the ductility or the resistance to shear of said column.

3. The process of claim 2 wherein said work area marginal edges are spaced apart at least one column diameter.

4. The process of claim 1 wherein the step of overwrapping said work area with a layer of high-strength, stretchable fibers includes wrapping said work area with a narrow tape comprising a layer of said fibers in side-by-side arrangement and wrapping said work area with said tape at a constant angle to said vertical axis of said column, overlapping a portion of the previous wrap, and then wrapping said tape in the opposite direction.

5. The process of claim 1 wherein said step of overwrapping said work area with at least one layer of high-strength, stretchable fibers includes wrapping said area with a wide tape comprising a layer of said fibers in side-by-side arrangement, said tape being as wide as said work area.

6. The process of claim 5 wherein said step of overwrapping said work area includes overwrapping said work area with at least two layers of high-strength, stretchable fibers.

7. The process of claim 1 including the additional step of tightly overwrapping said coat of hardened material and stretched fibers with at least one passive layer of material to provide additional compressive force to the concrete column underlying said work area.

8. The process of claim 1 wherein said fibers are selected from the group consisting of those having an ultimate elongation of between about 4% to about 8%.

9. The process of claim 6 wherein said fibers are selected from the group consisting of those having an ultimate elongation of between about 5% to about 7%.

10. The process of claim 1 wherein said fibers are selected from the group consisting of fibers having a diameter of between about 0.00048 inches and about 0.017 inches.

11. The process of claim 1 wherein said fibers are selected from the group consisting of carbon fibers, glass fibers, polyaramid fibers and mixtures thereof.

12. The process of claim 1 wherein said hardenable material applied over said layer of fibers is a polymerizable, hardenable plastic having a tensile elongation greater than that of said fibers.

13. The process of claim 12 wherein said polymerizable, hardenable plastic is selected from the group consisting of epoxy resins, polyester resins and mixtures thereof.

14. The process of claim 12 wherein said polymerizable, hardenable plastic includes fillers.

15. The process of claim 1 wherein said hardenable, low-shrink liquid injected under said layer of fibers is selected from the group consisting of epoxy resins, polyester resins, grouts, cements, foamable hardenable plastics, and mixtures thereof.

16. In a vertically-oriented column, having a base end resting on a supporting surface and an upper end spaced thereabove in contact with an overhead load, to provide support thereto, a process of strengthening the column to increase its ability to withstand increased physical loading accompanying an earthquake, comprising the steps of:

a) defining a work area by spaced-apart upper and lower marginal edges arranged circumferentially about the column and over the surface thereof, to which said strengthening is to be accomplished;

b) forming at least one vent channel in the surface of the column extending from within said work area upward above said upper marginal edge;

c) forming at least one injection channel in the surface of the column extending from within said work area downward below said lower marginal edge;

d) applying a flexible, liquid-impermeable membrane against the surface of the column over said work area and sealing same to form a liquid-impermeable barrier surrounding the entire column between said upper marginal edge and said lower marginal edge of said work area;

e) inserting injection means in said injection channel between the surface of the column and said membrane including one end extending outward therefrom;

f) inserting vent means in said vent channel between the surface of the column and said membrane including one end extending outward therefrom;

g) overwrapping said membrane with at least one layer of high-strength, stretchable fibers wherein said fibers are oriented at an angle with respect to the vertical axis of the column;

h) applying over said layer of fibers, a layer of hardenable material, having a tensile elongation at least as great as the tensile elongation of said fibers and being capable of expanding and stretching with said fibers, and hardening said layer to form a hard shell over said fibers and said work area;

i) applying pressure-retaining means circumferentially about the column over said layer of hardened material adjacent said upper and said lower marginal edges of said work area to form a pressure-retaining area over said work area;

j) injecting a quantity of a hardenable, low-shrinkable liquid material in through said injection means, between the surface of the column and said membrane over said work area, in an amount sufficient to fill the area therebetween and simultaneously exhaust any air trapped between said membrane and the surface of the column; and, k) closing said vent means, after exhaustion of all air trapped between said membrane and the column, and continuing to inject a further quantity of said material under pressure in an amount sufficient to cause said fibers to undergo about ½% to about 4% elongation.

17. The process of claim 16 wherein the step of defining said work area involves determining whether the column is in a single bend mode or a double bend mode and determining whether said strengthening is to be applied to improve the ductility or the resistance to shear of said column.

18. The process of claim 17 wherein said work area marginal edges are spaced apart at least one column diameter.

19. The process of claim 16 wherein the step of overwrapping said work area with a layer of high-strength, stretchable fibers includes wrapping said work area with a narrow tape comprising a layer of said fibers in side-by-side arrangement and wrapping said work area with said tape at a constant angle to said vertical axis of said column overlapping a portion of the previous wrap, and then wrapping said tape in the opposite direction.

20. The process of claim 16 wherein said step of overwrapping said work area with at least one layer of high-strength, stretchable fibers includes wrapping said area with a wide tape comprising a layer of said fibers in side-by-side arrangement said tape being as wide as said work area.

21. The process of claim 20 wherein said step of overwrapping said work area includes overwrapping said work area with at least four layers of high-strength, stretchable fibers.

22. The process of claim 16 including the additional step of tightly overwrapping said layer of hardened material and stretched fibers with at least one passive layer of material to provide additional compressive force to the concrete column underlying said work area.

23. The process of claim 16 wherein said fibers are selected from the group consisting of those having an ultimate elongation of between about 4% to about 8%.

24. The process of claim 23 wherein said fibers are selected from the group consisting of those having an ultimate elongation of between about 5% to about 7%.

25. The process of claim 16 wherein said fibers have a diameter of between about 0.00048 inches and about 0.017 inches.

26. The process of claim 16 wherein said fibers are selected from the group consisting of carbon fibers, glass fibers, polyaramid fibers and mixtures thereof.

27. The process of claim 16 wherein said hardenable material applied over said layer of fibers is a polymerizable, hardenable plastic having a tensile elongation greater than that of said fibers.

28. The process of claim 27 wherein said polymerizable, hardenable plastic is selected from the group consisting of epoxy resins, polyester resins and mixtures thereof.

29. The process of claim 27 wherein said polymerizable, hardenable plastic includes fillers.

30. The process of claim 16 wherein said hardenable, low-shrink liquid material injected under said layer of fibers is selected from the group consisting of epoxy resins, polyester resins, grouts, cements, foamable hardenable plastics, and mixtures thereof.

31. The process of claim 16 wherein said step of forming at least one vent channel in said surface of the column includes the step of chiseling said channel with hand tools.

32. The process of claim 16 wherein said step of forming at least one vent channel in said surface of the column includes the step of cutting said channel with a concrete saw.

33. The process of claim 16 wherein said step of forming at least one injection channel in said surface of the column includes the step of chiseling said channel with hand tools.

34. The process of claim 16 wherein said step of forming at least one injection channel in said surface of the column includes the step of cutting said channel with a concrete saw.

35. The process of claim 16 wherein said step of applying a flexible, liquid-impermeable membrane against the surface of the column over said work area includes the steps of applying a heat-sealable, flexible, liquid-impermeable membrane against the surface of the column over said work area, overlapping the vertical edges of said membrane and heat sealing said overlapped edges to achieve a complete seal over said work area.

36. The process of claim 16 wherein said step of inserting injection means in said injection channel includes the step of inserting a length of pressure-resistant plastic tubing into said channel, under said membrane and allowing one end of said tubing to remain outside said membrane.

37. The process of claim 16 wherein said step of inserting vent means in said injection channel includes the step of inserting a length of pressure-resistant plastic tubing into said channel, under said membrane and allowing one end of said tubing to remain outside said membrane.

38. The process of claim 16 including the additional step of sealing said injection means in said channel using a hydraulic-type cement.

39. The process of claim 16 including the additional step of sealing said vent means in said channel using a hydraulic-type cement.

40. The process of claim 16 wherein said step of applying pressure-retaining means circumferentially about the column over said layer of hardened material adjacent said upper and said lower marginal edges of said work area includes the steps of providing an elastomeric seal over said upper and lower marginal edges of said work area, applying a metal band thereover, said band having a pair of terminal ends turned outward from the column surface and having a pair of apertures formed therethrough, providing a cross-bolt through said apertures, and tightening said bolt to draw said terminal ends together.

41. The process of claim 40 including the additional step of providing a slider plate under said terminal ends over which said ends slide, during the tightening step, to become buried in said seal to form a pressure-resistant closure.

42. The process of claim 40 including the additional step of double-backing said terminal ends on to each other and welding them to form loops, providing a short length of solid bar for placement in said loops, forming a left-handed threaded bore through said one loop and its enclosed bar, forming a right-handed bore through said other loop and its enclosed bar, providing a rod having one part of its length left-hand threaded and another part of its length right-hand threaded and threadably inserting said rod in said bores so that by twisting said bar in one direction said terminal ends are drawn together and by twisting said bar in the opposite direction said terminal ends are pushed apart.

* * * * *

Adverse Decisions In Interference

Patent No. 5,043,033; Edward R. Fyfe, PROCESS OF IMPROVING THE STRENGTH OF EXISTING CONCRETE SUPPORT COLUMNS, Interference No. 103,367, final judgment adverse to the patentee rendered February 26, 1998, as to claims 1-7 and 11-15.
*(Official Gazette July 7, 1998)*